(12) United States Patent
Fischer et al.

(10) Patent No.: US 6,886,338 B2
(45) Date of Patent: May 3, 2005

(54) GAS GENERATOR

(75) Inventors: Joachim Fischer, Mühldorf (DE);
Michael Gabler, Mühldorf (DE);
Achim Hofmann, Polling (DE)

(73) Assignee: TRW Airbag Systems GmbH,
Aschau/Inn (DE)

( * ) Notice: Subject to any disclaimer, the term of this patent is extended or adjusted under 35 U.S.C. 154(b) by 0 days.

(21) Appl. No.: 10/864,213

(22) Filed: Jun. 9, 2004

(65) Prior Publication Data

US 2004/0261409 A1 Dec. 30, 2004

(30) Foreign Application Priority Data

Jun. 27, 2003 (DE) .......................... 203 09 949

(51) Int. Cl.⁷ ............................................. F01B 29/08
(52) U.S. Cl. ...................... 60/632; 280/736; 280/741; 280/742
(58) Field of Search ...................... 60/632, 637, 638; 280/736, 737, 741, 742

(56) References Cited

U.S. PATENT DOCUMENTS 3,899,815 A * 8/1975 Maddox .................... 29/896.6
3,986,456 A * 10/1976 Doin et al. .................. 102/531
4,021,058 A 5/1977 Suzuki et al.
5,195,777 A 3/1993 Cuevas
5,450,723 A * 9/1995 Fohl ............................ 60/638
6,131,948 A 10/2000 Cuevas
2004/0124618 A1 * 7/2004 Schonhuber et al. ........ 280/736

FOREIGN PATENT DOCUMENTS

EP 0763451 3/1997

* cited by examiner

Primary Examiner—Hoang Nguyen
(74) Attorney, Agent, or Firm—Tarolli, Sundheim, Covell & Tummino L.L.P.

(57) ABSTRACT

A gas generator comprises an outflow chamber and a freeing element. The outflow chamber contains at least briefly gas under pressure, when the gas generator is activated and at least one outflow opening is arranged in a side wall of the outflow chamber. The freeing element is arranged non-displaceably in the outflow chamber and has a peripheral wall and a base wall. The peripheral wall extends along the side wall and closes at least one outflow opening before an activation of the gas generator. The base wall is connected with the peripheral wall. The freeing element is constructed so that on exceeding a predetermined gas pressure in the outflow chamber, the base wall turns inwards under partial plastic deformation of the peripheral wall and at least one hitherto concealed outflow opening is freed by the plastic deformation of the peripheral wall.

12 Claims, 3 Drawing Sheets

GAS GENERATOR

FIELD OF THE INVENTION

The invention relates to a gas generator.

BACKGROUND OF THE INVENTION

The influencing of the chronological outflow behaviour of gas generated by a gas generator is of great importance for vehicle occupant restraint systems. For example, it is advantageous for the filling of a gas bag, if the quantity of gas is emitted at least uniformly, viewed over time, or if at the start a smaller and then an increasing gas mass through-flow is made possible. In order to optimize the outflow behaviour, means are therefore used which free or close outflow openings of the gas generator, through which the gas can finally arrive at its destination, during the gas generation phase in line with specific objectives. Such means must operate reliably at high pressures and high temperatures, but at the same time are to be as favourably priced as possible and able to be installed without a great installation expenditure.

BRIEF SUMMARY OF THE INVENTION

It is an object of the invention to create a gas generator in which an influencing of the outflow behaviour of the generated gas is achieved in a simple manner.

This is achieved in that the gas generator comprises an outflow chamber and a freeing element. The outflow chamber contains at least briefly gas under pressure, when the gas generator is activated and at least one outflow opening is arranged in a side wall of the outflow chamber. The freeing element is arranged non-displaceably in the outflow chamber and has a peripheral wall and a base wall. The peripheral wall extends along the side wall, closes at least one outflow opening before an activation of the gas generator and circumscribes an interior of said feeing element. The base wall is connected with the peripheral wall. The freeing element is constructed so that on exceeding a predetermined gas pressure in the outflow chamber, the base wall turns inwards and is moved within or into said interior of said freeing element under partial plastic deformation of the peripheral wall and at least one hitherto concealed outflow opening is freed by the plastic deformation of the peripheral wall.

The freeing of the outflow opening therefore does not take place by means of a displacement of a cap or the destruction of a membrane, but rather is achieved through the controlled plastic deformation and change of shape of the freeing element connected therewith.

Preferably the length of the peripheral wall of the freeing element along the side wall is shortened with the plastic deformation of the freeing element, so that the peripheral wall, as it were, draws back from the outflow openings. Thus, no sections or parts of the peripheral wall are retained in the region of the outflow opening which has just been freed, which could influence its cross-section in an uncontrolled manner.

The base wall can be constructed in one piece with the peripheral wall, which offers advantages with regard to the production costs of the freeing element and the deformation behaviour of the peripheral wall.

Preferably, the freeing element is formed in a single piece.

In a preferred embodiment of the invention, the base wall is partially turned inwards into the peripheral wall already before an activation of the gas generator forming an indentation and the indentation deepens on exceeding the predetermined gas pressure. Through the provision of an initial indentation of a certain degree, an exact initial state is defined, by means of which the freeing behaviour of the outflow openings can be set in a manner which is able to be readily reproduced.

It has been found that particularly good values are achieved when the base wall continues into the peripheral wall at an angle of 180 degrees before the activation of the gas generator. The initial indentation is preferably chosen so that on the edge of the base wall, sections of the base wall and of the peripheral wall lie directly against each other. At the transition between base wall and peripheral wall, with such an embodiment, a pronounced kink is formed which provides a weakened zone, along which the plastic deformation of the peripheral wall starts on exceeding the predetermined gas pressure. Preferably, here, the bending radius at the transition site between peripheral wall and base wall is the smallest bending radius which occurs on the entire freeing element.

The peripheral wall can be tubular or ring-shaped, but it is not absolutely necessary for it to be constructed as a closed wall. A slotted peripheral wall would also be able to be used, for example.

In order to seal the outflow openings before their being freed, the peripheral wall can lie under tension against an inner side of the side wall of the outflow chamber.

In a preferred embodiment of the invention, several outflow openings are provided, arranged one behind the other in axial direction of the outflow chamber, which are freed successively through the plastic deformation of the freeing element. The previous expression is meant to cover both an individual outflow opening and a group of outflow openings arranged approximately on the same axial height. The number of freed outflow openings depends inter alia on the internal pressure which is reached in the outflow chamber.

Not all the outflow openings of the outflow chamber have to be closed by the peripheral wall before the activation of the gas generator. In that case, a portion of the gas can already flow off out from the outflow chamber before the exceeding of the predetermined gas pressure in the outflow chamber.

The invention can be implemented both in gas generators which are designed as purely pyrotechnic gas generators, and also in hybrid gas generators which contain a pyrotechnic charge and a compressed gas. In addition, the use in pure cold gas generators is also conceivable, which manage without pyrotechnic heating charge and in which a membrane or the like is preferably opened from the exterior.

DETAILED DESCRIPTION OF A PREFERRED EMBODIMENT

The gas generator 10 presented in the described example embodiment is a basically known hybrid gas generator, in which the generated gas originates mainly from a reservoir filled with compressed gas, constructed as a pressure container 12. In addition, a pyrotechnic charge (not illustrated) is provided for heating and possibly for igniting the gas.

Adjoining one end of the pressure container 12 is an outflow chamber 14, which is closed with respect to the pressure container 12 by a membrane 16, which is only destroyed on an activation of the gas generator 10, so that the compressed gas can get from the pressure container 12 into the outflow chamber 14.

Figure 3:
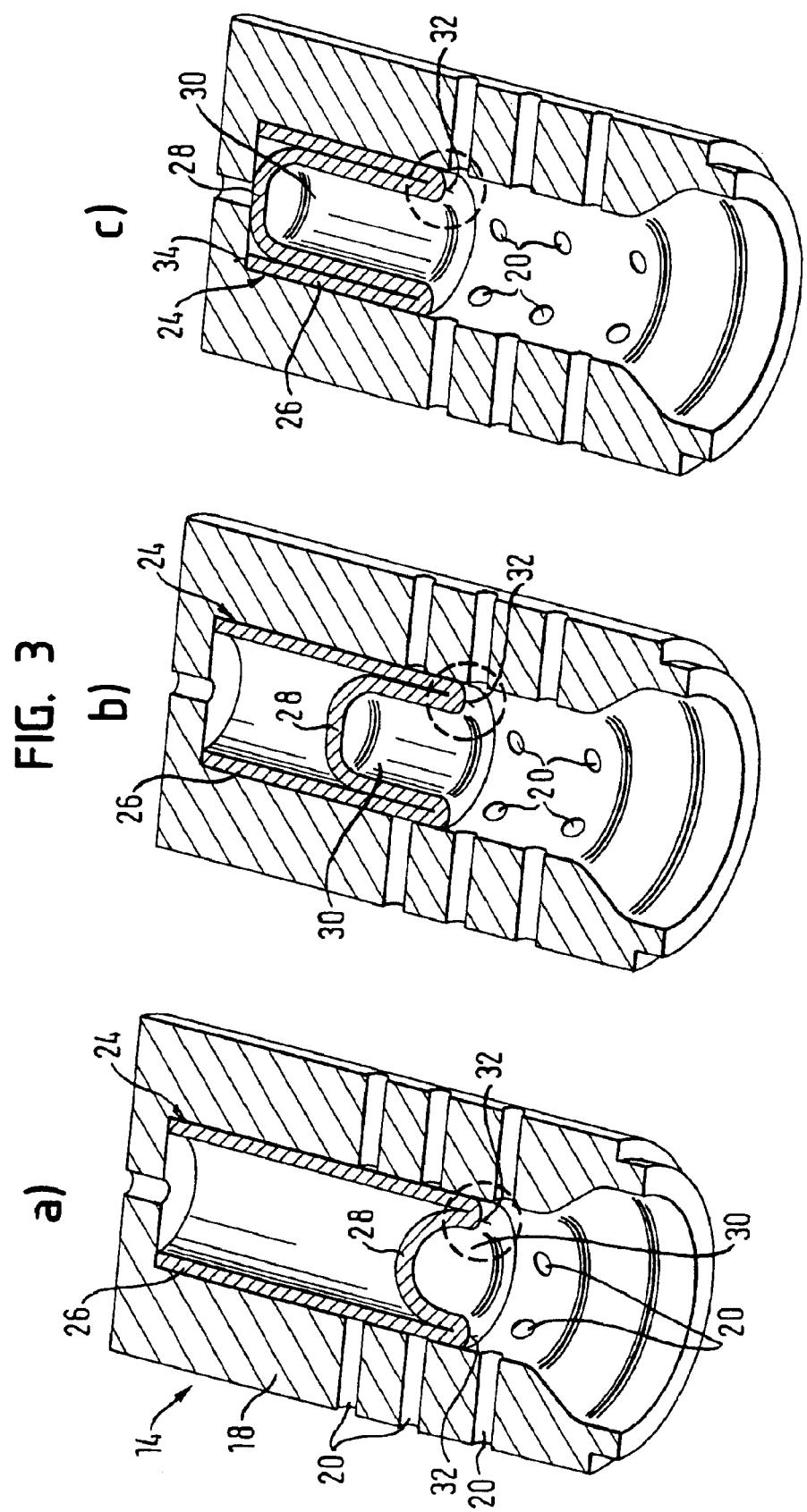
FIGS. 3a to 3c show a diagrammatic section through the outflow chamber of a gas generator according to the invention, at three different points in time.

In a side wall 18 of the outflow chamber 14, several outflow openings 20 are arranged, through which the gas can flow via a diffusor chamber 22 to its final destination, e.g. a gas bag. As can be seen in FIGS. 3a to 3c, the outflow openings 20 are arranged in several groups located at different heights in relation to the longitudinal axis A of the outflow chamber 14.

Figure 4:
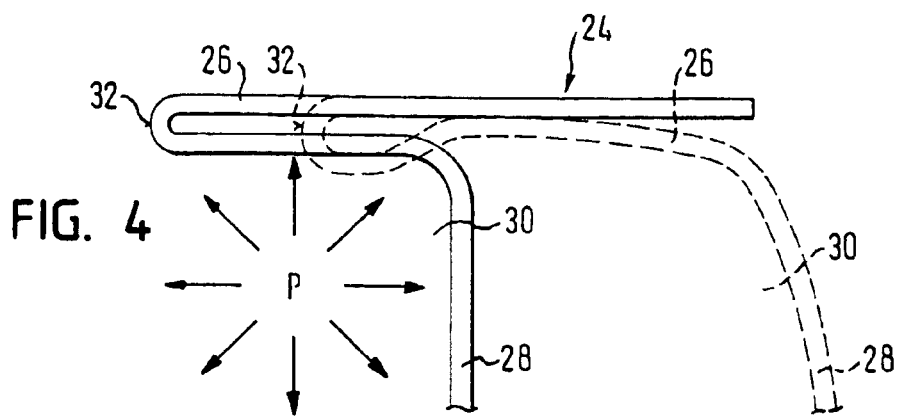
FIG. 4 shows a diagrammatic partial view of a freeing element of a gas generator according to the invention.
Figure 5:
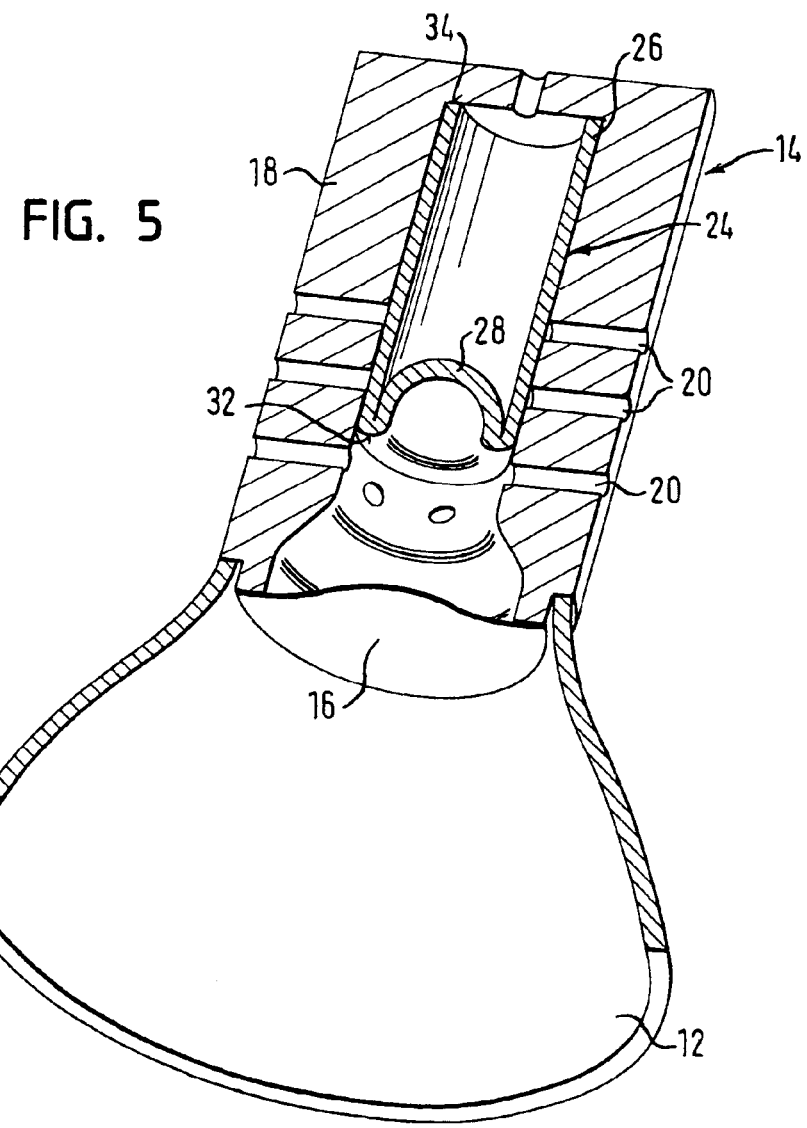
FIG. 5 shows a diagrammatically perspective sectional view of a part of a gas generator according to the invention.

In the outflow chamber 14 there is a freeing element 24, which is illustrated on an enlarged scale in FIG. 4. The freeing element 24 is a bush, closed on one side, and consists here of a metal sheet and has a peripheral wall 26 and a base wall 28 connected in one piece with the peripheral wall 26. In the state before the activation of the gas generator, as is shown in FIGS. 1, 2, 3a, 4 (continuous line) and 5, the peripheral wall 26 respectively closes one or more of the groups of outflow openings 20 arranged axially one behind the other. The peripheral wall 26 lies under pre-stressing against the inner side of the side wall 18, so that the concealed outflow openings 20 are sealed in a gas-tight manner. The peripheral wall 26 defines and circumscribes an interior of the freeing element 24.

The edge 34 of the freeing element 24 at its axially open end lies against the wall of the outflow chamber 14 facing away from the pressure container 12, so that the freeing element 24 can not move in axial direction A. A movement contrary to the axial direction A is prevented by the pre-stressing of the freeing element 24 against the side wall 18.

The base wall 28 is already turned in for a distance far into the peripheral wall 26 before the activation of the gas generator 10 by a deformation of the freeing element 24. The base wall 28 is folded into the hollow inner space of the bush to a certain degree, so that an indentation 30 with a predetermined depth is formed. At the edge of the indentation 30, the peripheral wall 26 continues at an angle of 180 degrees into the base wall 28. In this transition region, in this example sections of the base wall 28 and of the peripheral wall 26 lie against each other. Hereby, a pronounced kink is formed which, at the same time, represents a lower edge 32 of the freeing element 24.

On activation of the gas generator 10, the internal pressure p in the outflow chamber 14 increases suddenly, whereby a force is generated onto the base wall 28 in axial direction A of the outflow chamber 14, i.e. directed away from the pressure container 12. If the internal pressure p exceeds a predetermined value, the base wall 28 moves under deepening of the indentation 30 in axial direction A and is moved within the interior of the freeing element. Here, the peripheral wall 26 deforms in a plastic manner starting from the lower edge 32, whereby its axial length is shortened. This can be readily seen in FIGS. 3a to c and 4 (dashed line). The site of the plastic deformation is respectively marked with a circle in FIGS. 3a–c. The peripheral wall 26 is therefore deformed in a plastic manner parallel to the side wall 18 with the outflow openings 20 and not in longitudinal direction of the outflow openings 20 as with a conventional membrane.

Through this "rolling" of the peripheral wall 26 of the freeing element 24, the groups of outflow openings 20 lying axially one over the other are successively freed. The indentation 30 deepens to an extent until the base wall 28 lies against the axially upper end, i.e. the end of the outflow chamber 14 away from the pressure container 12 (see FIG. 3a). A plastic deformation respectively only takes place on the base wall 28 and in the region of the upper edge 32. The remainder of the peripheral wall 26, on the other hand, does not deform. The freeing element 24 does not move as a whole relative to the outflow chamber 14. The edge 34 of the freeing element 24 keeps its position against the wall of the outflow chamber 14 during the complete plastic deformation process.

Figure 1:
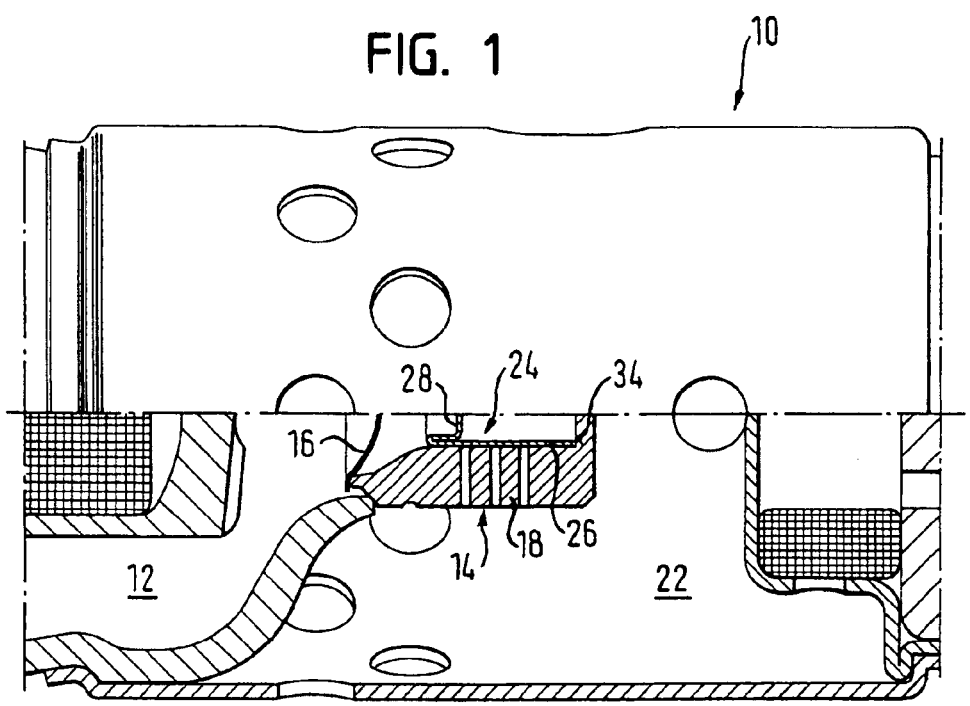
FIG. 1 shows a diagrammatic partial section of a gas generator according to the invention.
Figure 2:
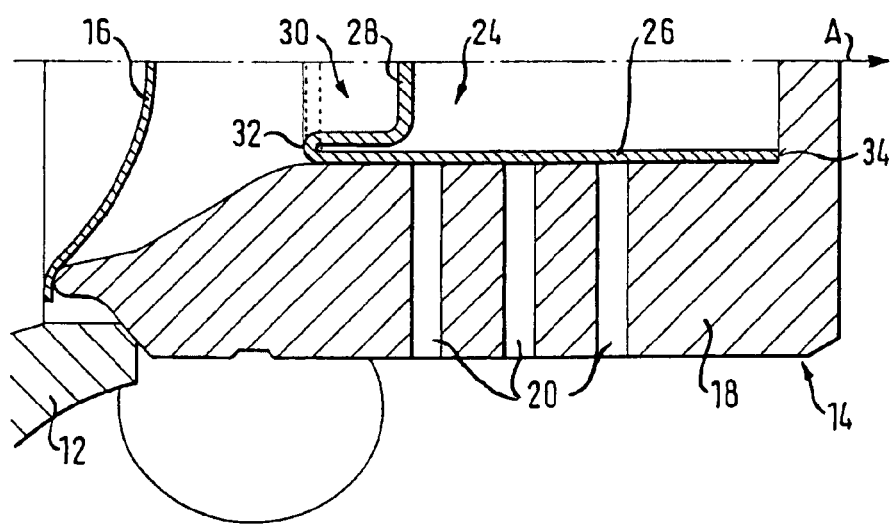
FIG. 2 shows an enlarged cut-out of FIG. 1.

In another embodiment the base wall 28 is not turned in in the initial state (without pressure exerted on it) and, thus, has no indentation 30 (see broken lines in FIG. 2). However, upon exerting the external pressure onto the base wall 28, the base wall is turned into and moved into the interior of the freeing element 24.

The moment of freeing of the respective outflow openings 20 is, inter alia, dependent on the pressure rise rate, the geometry of the freeing element 24, the material used for the freeing element 24 and its wall thicknesses and the size and number of the outflow openings 20. These parameters must be coordinated with each other by the specialist in the art, so that the desired outflow behaviour is achieved.

In the use of a described freeing element 24, proposed here, in a hybrid gas generator, the advantage is produced that the pressure drop can be delayed with respect to the case that from the outset all the outflow openings are opened. Therefore, both an initially very great mass flow is prevented, which for example has a negative effect on the unfolding behaviour of a gas bag, and also too small a mass flow during the remaining outflow time, which likewise would have a negative effect on the unfolding behaviour of a gas bag. Through the successive freeing of the outflow openings 20 as a function of the internal pressure p, the filling time of the gas bag can thus be optimized.

The described freeing element can also be used in a purely pyrotechnic gas generator. In this case, the use of the freeing element has a positive influence on the temperature behaviour of the gas generator. The freeing element can therefore be designed so that for example at −35° C. the combustion chamber pressure is not sufficient to bring about a plastic deformation of the material at the lower edge. In this case, only the already free outflow openings will allow gas to emerge, so that the internal pressure in the gas generator does not drop too intensively. At higher temperatures, e.g. at the upper margin of the temperature band at approximately 85° C., the material of the freeing element has lost strength, so that an intensive deepening of the indentation 30 will take place and all the outflow openings 20 are freed. The greater quantity of generated gas which occurs at high temperatures can hereby flow out optimally from the gas generator.

In each case, the freeing element is neither destroyed not does it break down into individual parts.

What is claimed is:
1. A gas generator comprising:
an outflow chamber (14) and
a freeing element (24),
said outflow chamber (14) containing at least briefly gas under pressure, when said gas generator (10) is activated and
at least one outflow opening (20) being arranged in a side wall (18) of said outflow chamber (14),
said freeing element (24) being arranged non-displaceably in said outflow chamber (14), said freeing element (24) having a peripheral wall (26) and a base wall (28), said peripheral wall (26) extending along said side wall (18), closing at least one outflow opening (20) before an activation of said gas generator (10), and circumscribing an interior of said feeing element (24), said base wall (28) being connected with said peripheral wall (26) and said freeing element (24) being constructed so that on exceeding a predetermined gas pressure (p) in said outflow chamber (14), said base wall (28) turns inwards and is moved within or into said interior of said freeing element (24) under partial plastic deformation of said peripheral wall (26) and at least one hitherto concealed outflow opening (20) is freed by said plastic deformation of said peripheral wall (26).

2. The gas generator according to claim 1, wherein, with said plastic deformation of said freeing element (24), a length of said peripheral wall (26) along said side wall (18) is shortened.

3. The gas generator according to claim 1, wherein said base wall (28) is constructed in one piece with said peripheral wall (26).

4. The gas generator according to claim 1, wherein said freeing element (24) is formed in a single piece.

5. The gas generator according to claim 1, wherein, already before an activation of said gas generator (10), said base wall (28) is partially turned inwards into said peripheral wall (26) forming an indentation (30) and said indentation (30) deepens on exceeding said predetermined gas pressure (p).

6. The gas generator according to claim 1, wherein before activation of said gas generator (10), said base wall (28) continues at an angle of 180 degrees into said peripheral wall (26).

7. The gas generator according to claim 1, wherein said peripheral wall (26) is tubular.

8. The gas generator according to claim 1, wherein said peripheral wall (26) is ring-shaped.

9. The gas generator according to claim 1, wherein said peripheral wall (26) lies under tension against an inner side of said side wall (18) of said outflow chamber (14).

10. The gas generator according to claim 1, wherein several outflow openings (20) are provided, arranged one behind the other in axial direction (A) of said outflow chamber (14), said outflow openings (20) being freed successively through said plastic deformation of said freeing element (24).

11. The gas generator according to claim 1, wherein before said activation of said gas generator (10) at least one outflow opening (20) of said outflow chamber (14) is not closed by said peripheral wall (26).

12. The gas generator according to claim 1, wherein said gas generator (10) contains compressed gas.

* * * * *

UNITED STATES PATENT AND TRADEMARK OFFICE
CERTIFICATE OF CORRECTION

| | | |
|---|---|---|
| PATENT NO. | : 6,886,338 B2 | Page 1 of 1 |
| APPLICATION NO. | : 10/864213 | |
| DATED | : May 3, 2005 | |
| INVENTOR(S) | : Joachim Fischer, Michael Gabler and Achim Hofmann | |

It is certified that error appears in the above-identified patent and that said Letters Patent is hereby corrected as shown below:

Column 5, line 6 after "said" change "feeing" to --freeing--.

Signed and Sealed this

Fourth Day of September, 2007

JON W. DUDAS
*Director of the United States Patent and Trademark Office*